United States Patent [19]
Hayes

[11] Patent Number: 4,574,779
[45] Date of Patent: Mar. 11, 1986

[54] SOLAR WATER HEATING SYSTEM

[76] Inventor: Patrick S. Hayes, 55 Hunter Dr., Oroville, Calif. 95965

[21] Appl. No.: 659,461

[22] Filed: Oct. 10, 1984

[51] Int. Cl.⁴ ............................................... F24J 2/30
[52] U.S. Cl. .................................... 126/435; 126/437
[58] Field of Search ................................ 126/435, 437

[56] References Cited

U.S. PATENT DOCUMENTS

| 4,287,879 | 9/1981 | Roark | 126/437 |
| 4,397,294 | 8/1983 | Mancebo | 126/437 |

FOREIGN PATENT DOCUMENTS

| 3953 | 9/1979 | European Pat. Off. | 126/435 |
| 187744 | 11/1983 | Japan | 126/437 |

Primary Examiner—Carroll B. Dority, Jr.
Attorney, Agent, or Firm—Lothrop & West

[57] ABSTRACT

An active solar hot water system includes a solar collection unit, a heat exchanger, and a draindown tank, ordered respectively in vertically descending relation. A pump for drawing thermally conductive recirculation fluid from the draindown tank and delivering same to the collection unit is positioned horizontally adjacent the draindown tank for positive gravity prime. The heat exchanger is disposed either within or is coiled exteriorly about the lower portion of a water storage tank, for conducting heat to potable water within the storage tank. Upon system shutdown, the thermally conductive fluid drains substantially solely into the draindown tank, providing freeze protection for the collection unit and minimizing heat drain off from the water storage tank through the heat exchanger.

4 Claims, 2 Drawing Figures

SOLAR WATER HEATING SYSTEM

BACKGROUND OF THE INVENTION

1. Field of the Invention

The invention relates generally to active solar hot water systems employing a drainback tank for storing the thermally conductive recirculation fluid during periods of system shutdown.

2. Description of the Prior Art

Most active solar systems employ two liquid systems, a hot water utilization system including a potable hot water storage tank having cold water inlet and hot water outlet lines, and a recirculating, solar heated fluid system including a solar collection panel, a "drainback" tank, and a heat exchange coil. In some active systems, these individual components have been combined or integrated, in various ways, usually to increase freeze protection or to simplify the system's overall complexity.

U.S. Pat. No. 4,257,479, issued to Newton, discloses a combined heat exchanger and draindown tank for an active solar system.

In Collins, U.S. Pat. No. 4,285,334, the potable hot water storage tank includes an internal heat exchanger unit for receiving liquid heated in the solar collection panel and for storing same during system shutdown.

U.S. Pat. No. 4,326,499, issued to Koskelo, illustrates a combined heat exchanger and draindown tank, actively interconnected to the solar circulating system and designed for heating water in the storage tank by means of thermal siphoning.

Muller, U.S. Pat. No. 4,253,446 teaches a water storage reservoir partitioned into hydraulically interconnected upper and lower tanks.

None of this art, however, suggests a purely active solar hot water system in which the solar collection unit, the heat exchanger unit, and the drain down tank are ordered respectively in vertically descending relation, in the manner set forth herein.

SUMMARY OF THE INVENTION

The invention includes a hot water utilization system, in which a water storage tank, preferably including either an electrical or gas backup heating system, is provided with the usual cold water input and hot water output lines.

Water within the storage tank is primarily heated by a heat exchanger, in thermal communication with the water and located either within the storage tank itself, or encircling its exterior wall. The heat exchanger, in turn, is heated by passing therethrough a fluid, heated by a solar collection unit.

A draindown tank is included to contain the solar heated fluid during times of system shutdown and to provide a reservoir from which a pump can draw the fluid for recirculation.

The solar collection unit, the heat exchanger, and the draindown tank are ordered, respectively, in descending elevation. As a consequence, when the solar heated fluid is not being recirculated through the system, it drains by gravity into the draindown tank.

With the solar collection unit drained of fluid, freezing temperatures can be endured without damage. Also, since the heat exchanger is similarly drained during shutdown, unwanted heat loss through the heat exchanger is significantly reduced and less energy is consumed by the backup heating system.

By placing the recirculation pump at generally the same elevation as liquid within the draindown tank, a positive gravity prime of the pump is assured at system startup.

It is also contemplated that the water storage tank and the draindown tank would preferably be vertically stacked with a single, solid, common dividing wall to form a single, compact unit, surrounded by an envelope of insulative material further to reduce heat losses of the system.

In summary, the invention embraces an active solar system in which certain components are ordered at particular elevations with respect to each other, providing a physically integrated storage and drainback tank exhibiting improved thermal efficiency.

DETAILED DESCRIPTION OF PREFERRED EMBODIMENT

Figure 1:
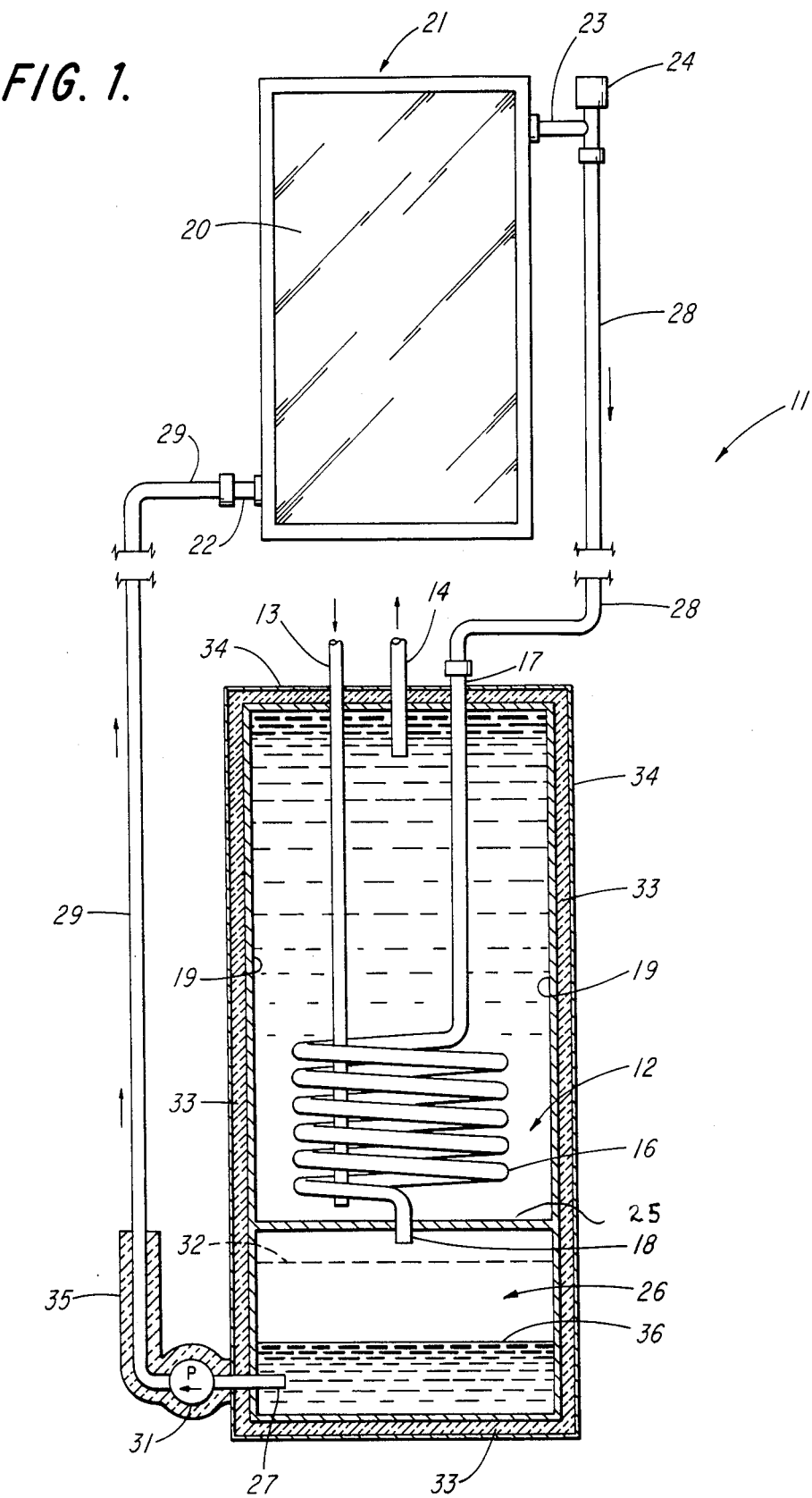
FIG. 1 is a diagrammatic view of the solar water heating system, the combined water storage tank and draindown tank assembly being depicted in cross section to reveal the internal heat exchanger coil and plumbing details; and, FIG. 2 is a view, partially in cross-section, of an alternative construction for the combined water storage tank and draindown tank with the heat exchange coil wound around the exterior wall of the storage tank.

Turning now to FIG. 1, the heating system 11 embodying the invention includes a water storage tank 12, having a potable cold water input line 13 and a potable hot water output line 14. Input line 13 is connected to a pressurized supply of cold water and output line 14 is connected to the hot water utilization system of the user.

A coiled heat exchanger 16 is preferably located at a chosen or predetermined elevation within the lower volume of the storage tank 12. An upper feed end 17 and a lower discharge end 18 are included at the extremities of the coil 16, the upper feed end extending upwardly and exteriorly through the confining wall 19 of the storage tank 12, while the lower discharge end 18 extends through a partition or bottom confining wall 25.

A solar collection unit 21 including a panel 20 is located outdoors and at an elevation above that of any portion of the heat exchanger 16, including the upper feed end 17. The solar collection unit 21 is provided with a cold recirculation fluid inlet 22 and a hot recirculation fluid outlet 23. A vacuum actuated air vent 24 is also included adjacent the hot fluid outlet 23.

A draindown tank 26, physically separated from the storage tank 12 by a partition 25, or confining wall, is located at an elevation lower than that of the heat exchanger 16, and includes a drain pipe 27 in its lower portion. The lower discharge end 18 of the heat exchanger 16 extends through the confining wall 25 of the storage tank 12 and projects slightly into the interior, upper portion of the draindown tank 26.

A first conduit 28 interconnects the hot recirculation fluid outlet 23 of the collection unit 21 with the upper feed end 17 of the heat exchanger 16. Similarly, a second conduit 29 interconnects the drain pipe 27 of the draindown tank 26 with the cold recirculation fluid inlet 22 of the collection unit 21.

A fluid recirculating pump 31 is provided within the second conduit 29 at an elevation no higher than the resting level 36 of circulation fluid within the draindown tank, when the pump is off.

The operation of the system is best illustrated by following a solar heating cycle as it progresses through a typical day. Early in the morning, the pump 31 is off, as a conventional panel sensor and associated logic circuitry (not shown) determine that the collection unit 21 is not sufficiently heated to contribute positively to the temperature within the storage tank 12. At such time, the recirculation fluid, preferably distilled water, will substantially fill the draindown tank 26, as indicated by shutdown level 32, shown in broken line.

During this shutdown period, the fluid level within the second conduit 29 also seeks level 32, thereby providing a gravity based prime for the pump 31.

It is also significant to note that with the exception of the small amount of recirculation fluid within the lowermost portion of the second conduit 29, all of the recirculation fluid is contained within the draindown tank 26. Since both the storage tank 12 and the draindown tank 26 are surrounded by an envelope of insulation 33 and a closure wall 34, heat losses to the outside are kept to a minimum. Pipe insulation 35 thermally shields the pump and the lower end of second conduit 29, thereby reducing heat losses to the room.

As the panel 20 heats through the morning and is eventually determined capable of making a positive heating contribution, the pump 31 is actuated to circulate the fluid throughout the system. The air vent 24 allows air to be purged from the collection unit 21, until the fluid, under pressure, hydraulically seals the vent. The fluid, now heated by its passage through the panel 20 of the collection unit 21, flows downwardly through the first conduit 28 and into the heat exchanger 16.

The heat exchanger 16, usually constructed of copper formed into a helical coil for maximum transfer of heat by a relatively compact structure, begins heating the cooler water within the lower portion of the storage tank 12. With an appreciable amount of heat now extracted, the fluid emerges from the discharge end 18 and re-enters the draindown tank 26, with the level of the fluid eventually stabilizing at the operative level 36.

As water within the storage tank 12 heats, a thermosiphon effect ensures that the hot water rises to the top of the tank, ready to be drawn off through the output line 14. When any hot water is utilized, cool water enters the storage tank 12 through the input line 13 and flows around the coils of the heat exchanger 16, providing efficient extraction of heat from the circulating fluid.

The pump 31 continues to recirculate the fluid throughout the day until at some point, a pre-determined ratio between the temperature of the fluid in the collection unit 21 and temperature of the water within the storage tank 12 is reached. At that moment, the pump 31 is disabled, and the drop in fluid pressure within the system allows air from the vent 24 to enter the collector and the various conduits. The fluid drains downwardly under gravity through both conduit legs of the system, eventaully to collect entirely within the draindown tank 26, except for the small quantity remaining in the lower end of the conduit 29 protected by pipe insulation 35.

Since the collection unit 21 and exposed, outdoor portions of the conduits 28 and 29 are free of any fluid, complete freeze protection is provided. With the heat exchanger 16 drained of fluid, very little heat is lost to areas outside the water storage tank. In the event that days go by without significant solar insolation, conventional electrical or gas backup systems (not shown) are employed to heat the water within the storage tank, so that normal utilization of hot water can continue.

While the vertically stacked combination of the water storage tank 12 and draindown tank 26 provides a space saving package, the two tanks could be remotely located, if desired. However, in order for the heating system of the invention 11 to function in the intended fashion, the physical relationship of the heat exchanger 16 and the draindown tank 26 must be such that the recirculation fluid within the heat exchanger 16 drains completely into the tank 26 when the pump 31 is shutdown. In other words, the tank 26 must be at an elevation lower than that of the heat exchanger 16.

Figure 2:
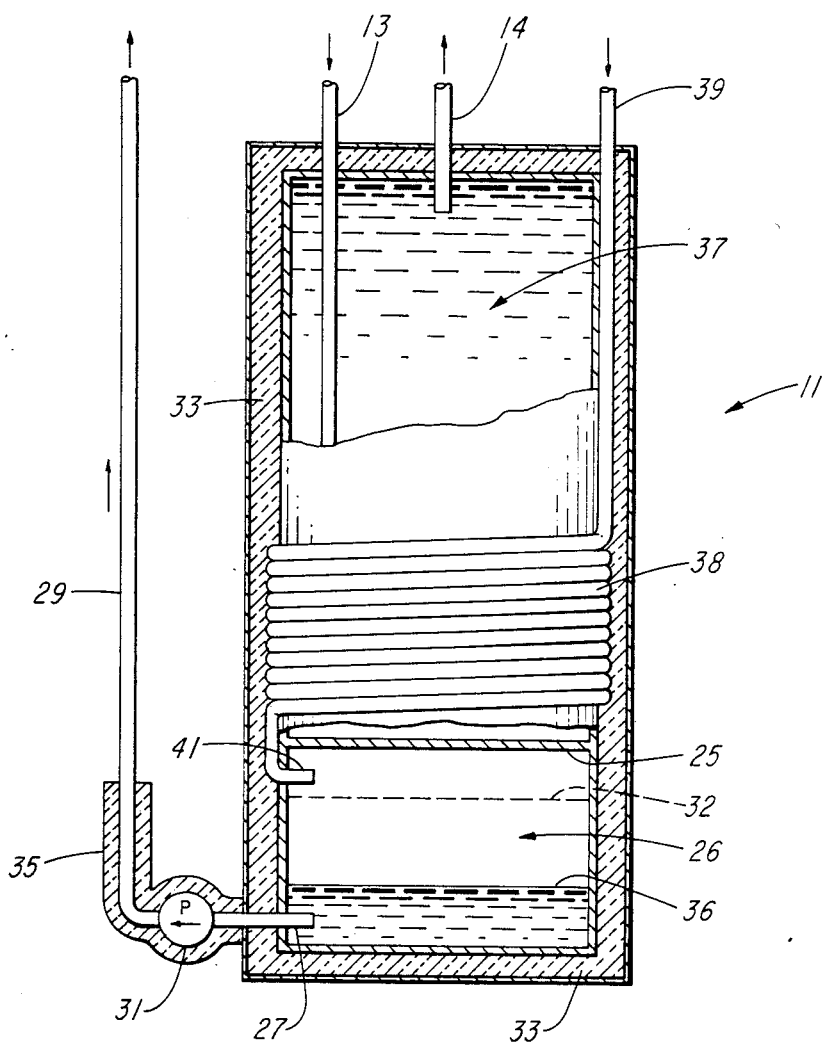

Another embodiment of the invention 11 is disclosed in FIG. 2. For purposes of simplicity, the solar collection unit has been eliminated from the drawing, for that aspect of the alternative embodiment is identical to that already illustrated and explained. Also, with exception of the differences noted below, the numerals for identifying respective components in the first and second embodiments correspond identically. The chief difference in the second embodiment is in the construction and operative relationship between the hot water storage tank 37 and the heat exchanger 38.

Some local building codes require that heat exchanger devices located within a hot water storage tank be "double walled" for safety. It is reasoned that should the recirculation fluid be toxic or otherwise become contaminated through a chemical reaction over a period of time, providing a second wall around the portion of the heat exchanger immersed within the storage tank will prevent dangerous contamination of the potable water, should the first wall of the heat exchanger rupture or leak.

It is generally recognized, however, that providing such a second wall around the first wall of the heat exchanger, with a static heat conductive medium therebetween. tends to reduce the overall efficiency of the heat exchanger in transferring heat to the stored water. Accordingly, the embodiment disclosed in FIG. 2 is offered as an alternative design, for use in those localities which would otherwise require double walled heat exchangers in such solar hot water systems.

It should be noted that the heat exchanger 38, the upper feed end 39, and the lower discharge end 41 are exterior to the water storage tank 37. Preferably, the coils of the heat exchanger 38 are tightly wound about the lower, exterior portion of the tank 37 to ensure an effective thermally conductive relationship therewith. By heating more directly the cooler water within the lower volume of the tank 37 the aforementioned thermosiphon effect will be offset to some extent, providing better mixing of the potable water. In all other respects, the embodiment illustrated in FIG. 2 operates in the same fashion as the preferred embodiment, already described, and therefore, the explanation need not be repeated.

It will be appreciated, therefore, that I have provided an active solar water heating system in which the elevational relationship of the solar collection panel, the heat exchanger, and the draindown tank provide effective freeze protection and thermally efficient operation.

What is claimed is:
1. An active solar water heating system comprising:
 (a) a water storage tank,

(b) a heat exchanger disposed within said storage tank at a predetermined elevation and having an inlet and an outlet,
(c) a solar energy collection unit located above said predetermined elevation and having an inlet and an outlet,
(d) a draindown tank located below said heat exchanger and sharing a common solid wall with said storage tank,
(e) means for conducting fluid from said heat exchanger to said draindown tank,
(f) a drain in said draindown tank,
(g) a first conduit connecting said outlet of said solar energy collector and the inlet of said heat exchanger,
(h) a second conduit connecting said drain and said inlet of said solar energy collector,
(i) and a pump in said second conduit for pumping liquid from said drain through said solar collection unit and from said solar collection unit through said first conduit and said heat exchanger to said draindown tank.

2. A solar water heating system as in claim 1 in which said water storage tank and said draindown tank are stacked in vertical relation and with said common solid wall disposed horizontally between them.

3. An active solar water heating system comprising:
(a) a vertically elongated enclosure,
(b) means including a single common solid wall dividing said enclosure into an upper tank and a lower tank,
(c) a solar energy collector unit disposed above said enclosure,
(d) a heat exchange coil disposed in thermal communication with said upper tank,
(e) means including said heat exchange coil for establishing a substantially closed loop fluid circuit extending between said collection unit and said lower tank,
(f) a pump in said circuit for circulating liquid from said lower tank through said circuit and back to said lower tank,
(g) and separate means for admitting other fluid to and releasing other fluid from said upper tank.

4. An active solar water heating system comprising:
(a) a water-holding enclosure,
(b) means including a single common solid wall for dividing said enclosure into a first substantially closed tank and a second substantially closed tank,
(c) a solar collection unit,
(d) a heat exchanger coil disposed in thermal communication with said first tank,
(e) means including said heat exchange coil for establishing a substantially closed loop circuit extending between said collection unit and said second tank,
(f) a pump for circulating water through said circuit,
(g) and separate means for admitting other liquid to and releasing other liquid from said first tank.

* * * * *